United States Patent
Faerber

(10) Patent No.: US 6,238,174 B1
(45) Date of Patent: *May 29, 2001

(54) STICKER TRANSFER FOR LUMBER STACKER

(75) Inventor: John D. Faerber, Spokane, WA (US)

(73) Assignee: U.S. Natural Resources, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,206

(22) Filed: Aug. 19, 1999

(51) Int. Cl.[7] .................................................. B65G 57/18
(52) U.S. Cl. .................................. 414/789.5; 414/793.4; 414/794.3; 414/794.1; 403/220
(58) Field of Search ............................. 414/789.5, 793.4, 414/794.3, 794.1, 24; 403/220, 229, 291

(56) References Cited

U.S. PATENT DOCUMENTS

| | | |
|---|---|---|
| 1,490,594 | 4/1924 | DeLateur . |
| 2,861,702 | 11/1958 | Mason . |
| 3,860,128 | 1/1975 | Lunden . |
| 3,904,044 | 9/1975 | Lunden . |
| 4,073,347 * | 2/1978 | Philpot ................. 172/710 |
| 4,090,618 | 5/1978 | Lehmann . |
| 4,253,787 | 3/1981 | Lunden . |
| 4,324,521 | 4/1982 | Lunden . |
| 4,360,303 * | 11/1982 | Rysti ..................... 414/42 |
| 4,671,401 | 6/1987 | Truninger . |
| 4,810,152 | 3/1989 | Gillingham . |
| 5,263,812 * | 11/1993 | Bowlin ................ 414/789.5 |
| 5,350,272 * | 9/1994 | Bowlin ................ 414/786 |
| 5,580,212 * | 12/1996 | Anderson et al. ..... 414/789.5 |
| 5,720,592 * | 2/1998 | Gillingham et al. ... 414/789.5 |
| 5,720,792 | 2/1998 | Gillingham . |
| 5,993,145 * | 12/1999 | Lunden ................ 414/789.5 |
| 6,007,295 * | 12/1999 | Sears et al. ........... 414/789.5 |
| 6,048,164 * | 4/2000 | Ritola ................. 414/789.5 |

* cited by examiner

Primary Examiner—Joseph A. Fischetti
(74) Attorney, Agent, or Firm—Robert L. Harrington

(57) ABSTRACT

A sticker transfer mechanism for a lumber stacker has a swing-away transfer arm for transferring stickers from a sticker conveyor to pans on stacking forks. An arm segment is pivotally mounted to a base section to form the swing-away transfer arm. The pivotal mounting of the arm segment permits the arm segment to pivot when encountering an obstruction.

4 Claims, 5 Drawing Sheets

STICKER TRANSFER FOR LUMBER STACKER

FIELD OF THE INVENTION

This invention relates to lumber stacking wherein sticks or stickers are placed between tiers of lumber for drying, and more particularly to the mechanism transferring the sticks from a sticker infeed conveyor.

BACKGROUND OF THE INVENTION

A stacking apparatus including sticker placement mechanism is disclosed in commonly assigned U.S. Pat. No. 6,048,164. The present invention is directed to a sticker transfer arm having particular application to the sticker placement mechanism of that application and the disclosure therein is incorporated herein by reference.

In the above-referenced disclosure, lumber stacking forks oscillate back and forth between a lumber infeed conveyor and a stack of lumber for transferring tiers of lumber from the conveyor to the stack. The forks carry sticker pans and a sticker infeed conveyor brings stickers to a location near the retracted position of the forks and sticker transfer arms are cooperatively cycled to transfer stickers into the path of the forks for loading the stickers into the sticker pan.

There are three apparatus motions that are cooperatively cycled to achieve the above functions. The three apparatus referred to are the forks, the transfer arms and the sticker conveyor. The forks oscillate in a rectangular-like path. Upon receiving the stickers and lumber tier, the forks move along an upper path to a position over the stack. The forks then move downward to deposit the stickers and lumber tier onto the stack. The forks then retract along a lower path to a position ready to receive the stickers and lumber tier. The forks then raise to the position of the upper path and in the process receive the stickers and lumber tier.

The movement of the forks in the oscillating path is substantially continuous and the other two apparatus have to be cycled in time to the proper positions. The transfer arms have an upper position where a sticker is positioned in an extended finger at the distal end of the sticker arms directly in the path of the fork in its upwardly directed movement. The sticker pans on the fork are slotted at positions aligned with the fingers so that the fingers can pass downwardly through the pans and in the process the stickers are transferred to the pan. It is important that the transfer arms have reached this upper position before the forks are fully retracted.

The arms lower the fingers down through the pan slots of the fork and into the path of stickers being conveyed on the infeed conveyor. The stickers are spaced apart on the conveyor and the fingers dip down between the spaced apart stickers. The stickers are moved by the infeed conveyor over the fingers and the fingers are raised to lift the stickers from the conveyor and into the upper position for transfer to the fork. The infeed conveyor has to be accordingly timed with the arm movement to provide a space for the finger to move into the conveyor path and then move stickers into position over the fingers.

It will be appreciated that a number of situations can occur to upset the timing of these movements. If a sticker is mis-located on the sticker conveyor, the transfer arm when lowered into the conveyor path, can engage (crash) that sticker. If a sticker is broken and a portion hangs below the fingers during the transfer mode, the forks and/or pans on the fork when sliding under the fingers can engage (crash) with the broken sticker to apply a sideway directed force on the transfer arms.

Any crash as between the fingers and the fork (e.g., resulting from a broken sticker) or, as between the fingers and the sticker infeed conveyor (e.g., resulting from a mis-located sticker) can result in damage, e.g., to the sticker transfer arms. The stacker has to be shut down and repairs made at a significant cost.

BRIEF DESCRIPTION OF THE INVENTION

The present invention provides a swing away feature for the transfer arms. In the preferred embodiment, the arm is provided as a rear section that is pivotally connected to the stacker and a front or finger carrying section that is attached to the rear section. Adjoining ends of the sections are overlapped and connected together by a pin or bolt. The overlapping ends are channel-shaped to provide a cupped seating of the ends to urge retention of the sections in a fixed relation. The pin extends through the ends and beyond, and a strong coil spring on the pin or bolt urges the sections together and in the seated relationship.

The sections are held in the desired relationship by the spring and bolt connection during normal operations. In the event of a crash, the spring will compress and the finger or front section responds by pivoting around the connection. The connection allows universal pivoting, i.e., sideways in either direction and up or down as may be required by the manner of impact.

In the event of certain minor crashes, the front arm section may simply be spring biased back to the operative position. A more severe crash may cause the front section to be twisted sideway out of position in which event the apparatus is shut down and the front section merely pivoted back to its operative position in a matter of minutes if not seconds.

The invention will be more fully understood and appreciated upon reference to the following detailed description and the accompanying drawings.

DESCRIPTION OF THE PREFERRED EMBODIMENT

Figure 1:
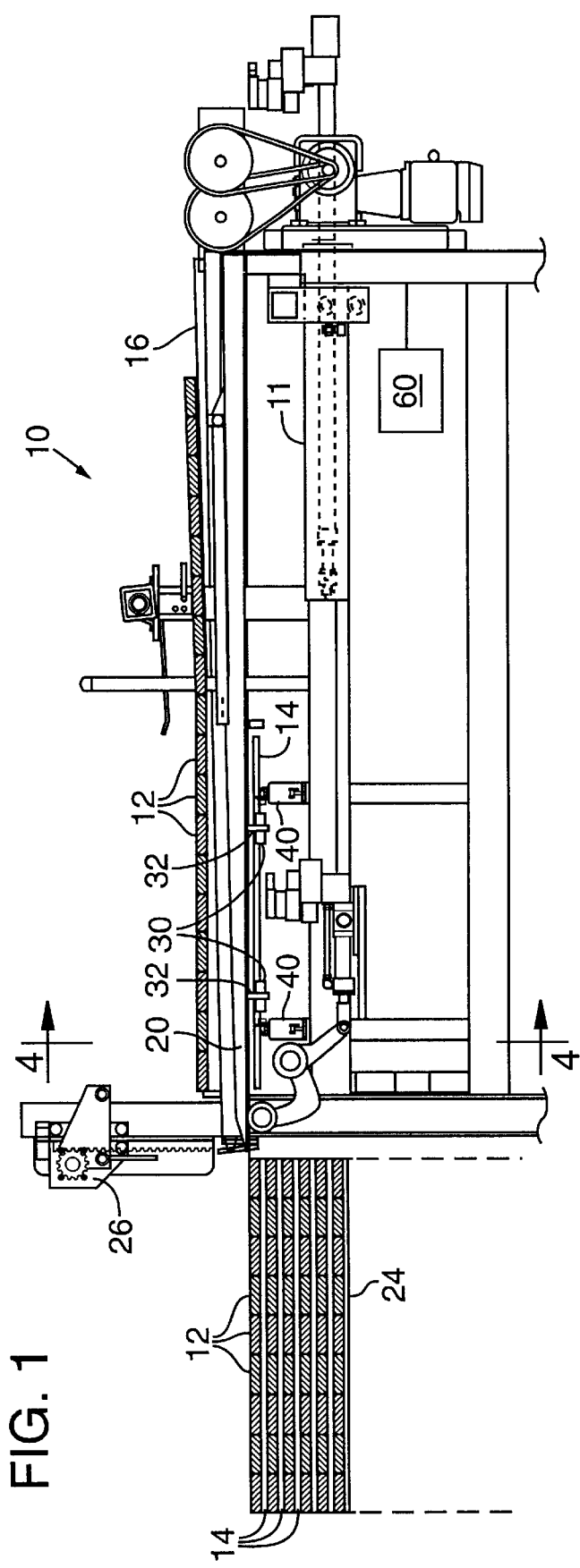
FIGS. 1, 2 and 3 are side views of a lumber stacker at different stages in the process of stacking lumber pieces.

FIG. 1 illustrates a lumber stacker 10 arranged to stack lumber pieces 12 in layers to form a stack 24. Each layer of lumber pieces 12 in the stack 24 is separated by stickers 14. The stickers 14 are placed transverse to the length of the lumber pieces 12 and are positioned at intervals along the length of the lumber pieces 12. The stickers 14 separate each layer of the lumber pieces 12 from another and provide an air gap between each layer on the stack 24.

A conveyor 16 conveys the lumber pieces 12 onto the stacker 10. The stacker 10 has forks 20 that are moved in a substantially rectangular pattern of movement through the different stages of stacking by a known mechanism 11.

Figure 2:
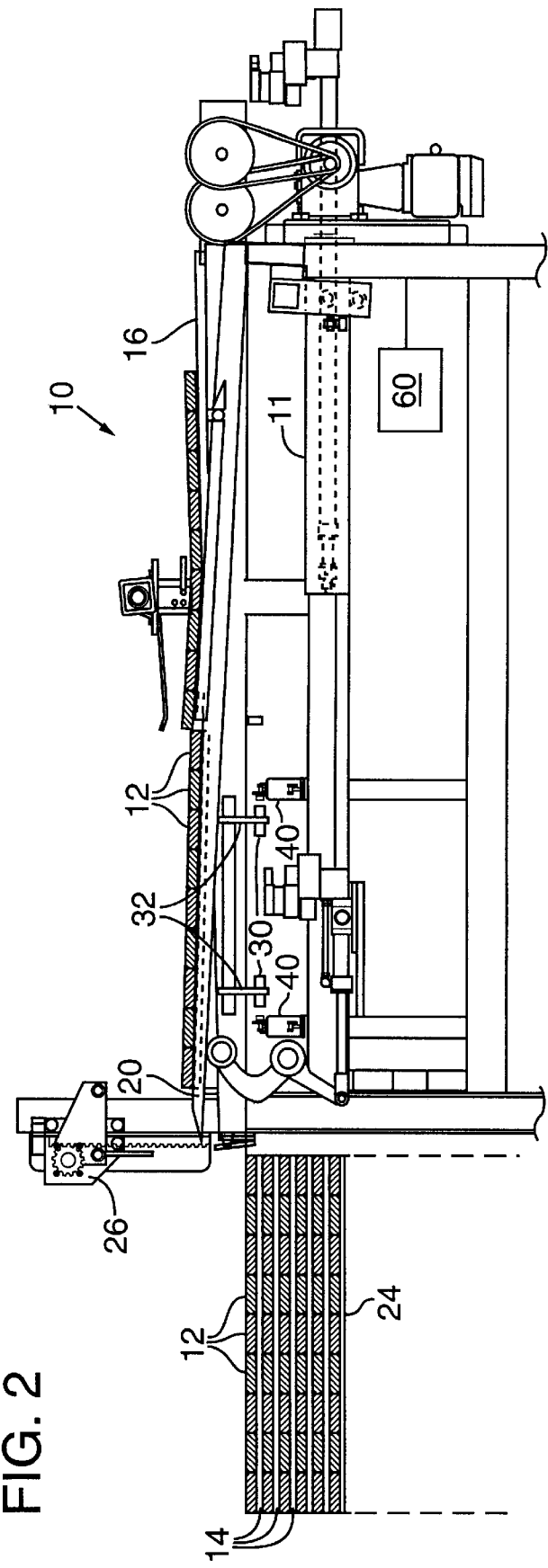

Only one fork 20 is shown in the side views of the figures but the reader will appreciate that at least two spaced apart forks 20 are required to lift and transfer the lumber pieces 12. The forks 20 are shown in FIG. 1 in a layer receiving position (hereafter referred to as the start position although as will be explained, the forks 20 cycle in a continuous operation). The forks 20 move vertically upwardly from the start position to engage a specific number of the lumber pieces 12 to elevate them from the conveyor 16 as shown in FIG. 2. As the forks 20 elevate from the start position, stickers 14 (FIG. 4) are received in sticker pans 22 which are provided on the side of the forks 20. The stickers 14 as received in the pans 22 will be positioned underneath the multiple lumber pieces 12 received on the forks 20 as shown in the dash line positions of FIG. 4.

Figure 3:
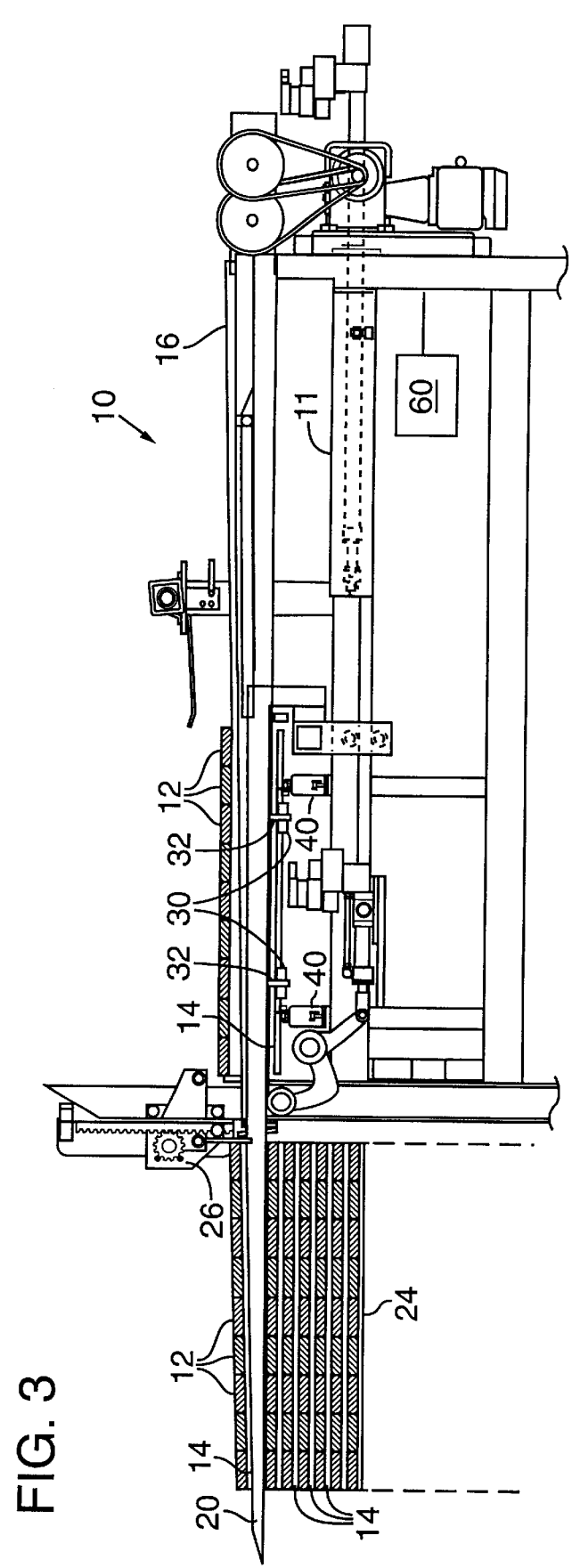

When elevated, the forks 20 move outwardly to a lumber depositing station to position the lumber pieces 12 and the stickers 14 above the stack 24 of lumber 12. The forks 20 as shown in FIG. 3 have been moved outwardly over the stack 24 and have been moved vertically downward preparatory to depositing the lumber pieces 12 on the stack 24. A stripper mechanism 26 descends as the forks 20 are lowered vertically downward. The forks 20 are retracted horizontally inward to the start position and the stripper mechanism 26 forces the lumber pieces 12 and the stickers 14 off the forks 20 and onto the stack 24.

Figure 4:
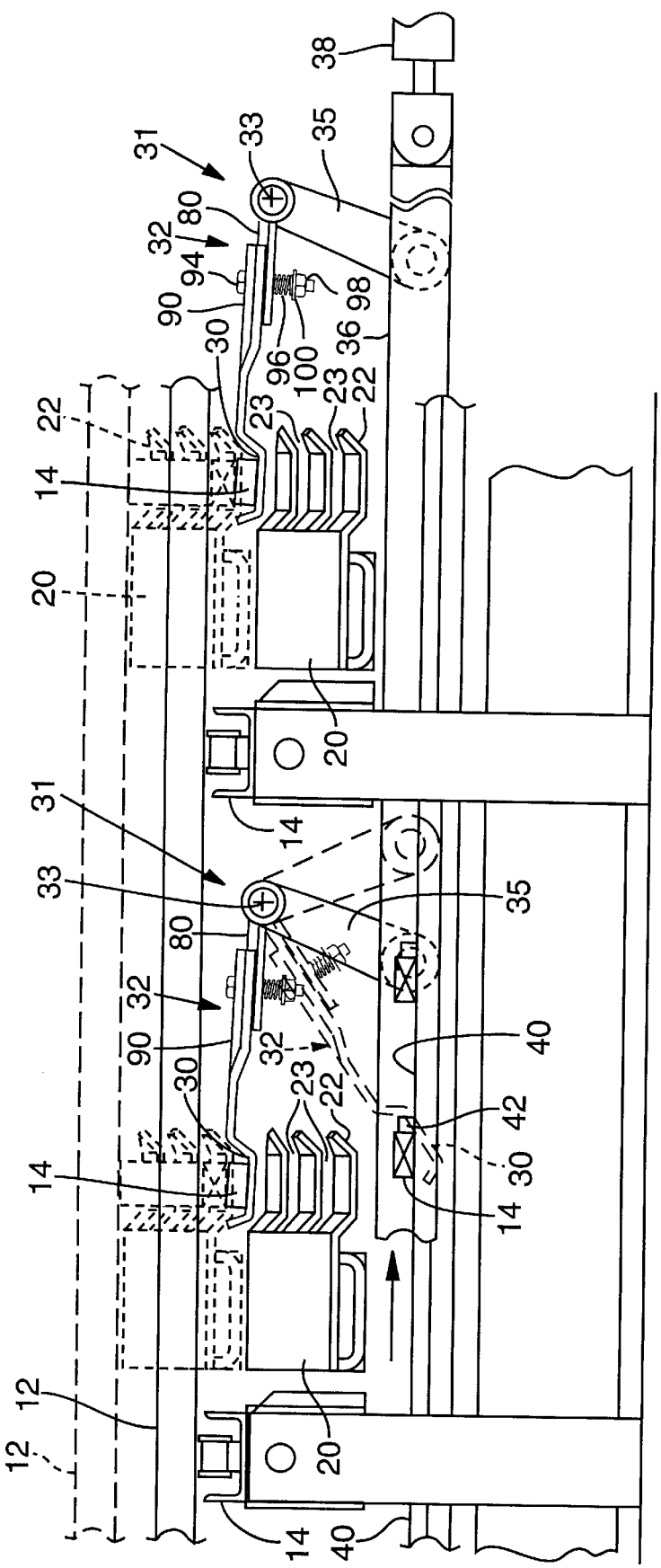
FIG. 4 is a view of a sticker transfer mechanism of the lumber stacker of FIGS. 1, 2 and 3 as if taken on view lines 4—4 of FIG. 1 but with the transfer mechanism at a still different position than illustrated in FIGS. 1, 2 and 3.

With reference now to FIG. 4, during the cycle time whereby the forks 20 are moving outwardly over the stack of lumber 24 and returning to the start position as illustrated in FIG. 1, a transfer mechanism 31 is transferring stickers 14 from a sticker conveyor 40 to a position where the stickers will be transferred onto the pans 22 of the forks 20. As shown in FIG. 4, each pan 22 is a plurality of segments spaced apart vertically and longitudinally. (The stickers lay in the pan at an angle to the tier of lumber which provides smoother action as known to the art.)

The transfer mechanism 31 includes a pair of pivot (transfer) arms 32 that have fingers 30 (holding fingers) at their distal ends and are pivotally fixed to pivot 33. A crank arm 35 fixed at one end to pivot 33 and pivotally connected at the other end to shuttle bar 36 rotates pivot 33 and thereby pivots pivot arm 32 upwardly to lift a sticker from sticker conveyor 40 (see dash line position of pivot arm 32) to position the sticker 14 at the proper elevation for transferring the sticker 14 to the pan 22 of the fork 20 (see solid line position of pivot arm 32).

When the forks 20 have been retracted from the stack 24, the forks 20 move under the stickers 14 (and under a waiting tier of lumber pieces 12). The forks 20 raise upwardly to receive the stickers 14 and then the lumber pieces 12. The forks 20 then move outwardly for a return trip to the stack. The pans 22 of the forks 20 have spaces 23 as noted above to permit pans 22 to pass upwardly through the fingers 30 and to allow the fingers 30 to pivot downwardly as the forks 20 are moved upwardly. The pivot arms 32 continue to pivot downwardly to be in position to pick up the next sticker 14 on the sticker conveyor 40.

Movement of the shuttle bar 36 produces pivoting of the crank arms 35 and thus the pivot arms 32 in unison. In this embodiment, the shuttle bar 36 is moved by a cylinder 38. It will be appreciated by those skilled in the art that the shuttle bar 36 may be mechanically coupled to the movement of the forks 20. Also, it will be appreciated that the arrangement of components allows the coordination of movements as between the forks 20, the conveyor 40 and the transfer mechanism. Thus the arms 32 are pivoted from a position above conveyor 40 and so that the fingers 30 of the arms extend rearwardly from the pivot into the path of the conveyor movement. Such allows running of the conveyor 40 except as may be required for the fingers 30 to pick a sticker 14 off the conveyor 40 (and even such pick off of the stickers may be achieved without stopping the conveyor). Also, the pans 22 are on the side of the fork (the right side in FIG. 4) so that the pans can move under the cradles with the cradles in the raised position (solid line position in FIG. 4).

A control 60 (FIGS. 1–3) is provided for controlling the stacker 10. The control 60 coordinates the movement of the pivot arms 32, the conveyors 16 and 40 and the forks 20. Also, the sticker conveyor 40 is of a type that has a speed up mechanism to force the stickers 14 into abutment with restricting stops 42 on the conveyor 40 to properly align the stickers 14 for transfer by the fingers 30.

Previous devices have a solid or one piece arm 32. There are occasions when interferences occurred between the sticker 14, the finger 30 (solid arm 32) and the pan 22 of the fork 20. This results, for example, when a sticker 14 is damaged or out of its desired position. When the sticker has a depending portion (partially broken away from the elongate sticker) it may become jammed between the finger 30 and the pan 22. Continued operation of the stacking machine, particularly the movement of the fork 20 results in the arm 32 being damaged. It is also possible for the solid arm 32 to become damaged when for some reason a sticker 14 is out of position on the sticker conveyor 40 and is in the travel path of the arm 32 when it descends to pick up the next sticker. The solid arm 32 as it travels downward onto the misplaced sticker is likely to become bent or otherwise damaged. Repairs required when the arm 32 is damaged are costly and time consuming.

Figure 5:
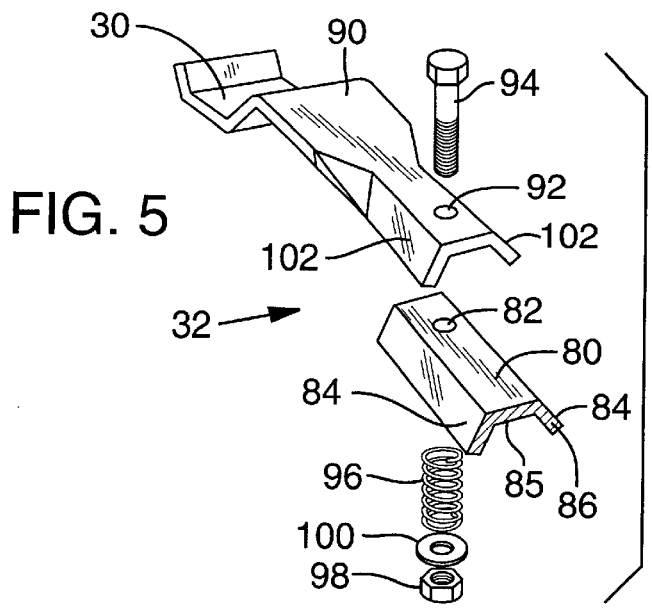
FIG. 5 is an exploded view of a transfer arm assembly.
Figure 6:
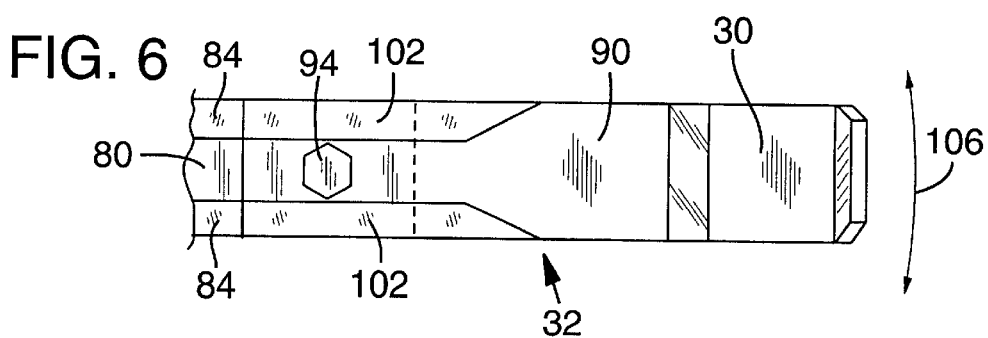
FIG. 6 is another view of the transfer arm assembly of FIG. 5.

Refer now to FIGS. 5–9 which illustrates a swing-away pivot arm 32 in accordance with present invention. The arm 32 has a base section 80 that has an end 86 fixedly joined to the pivot 33 as by welding (see FIG. 4). The opposite end of the base section 80 has an aperture (bore) 82. As best seen in FIG. 5, the base section 80 is channel shaped having tapered sides 84.

Figure 7:
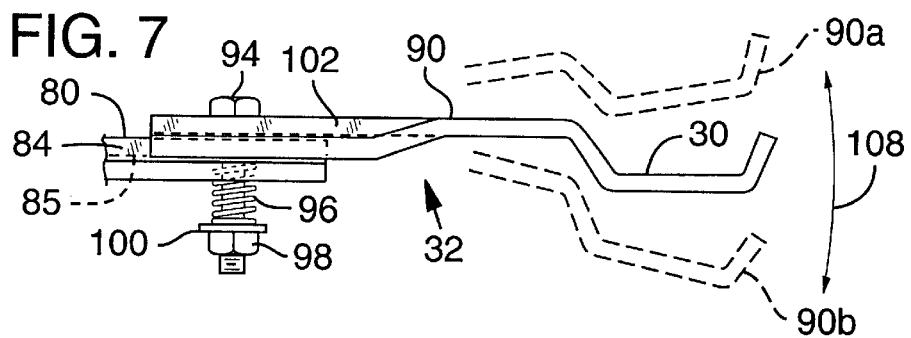
FIG. 7 is a view illustrating one of the pivotal movements of the transfer arm assembly of FIG. 5.
Figure 8:
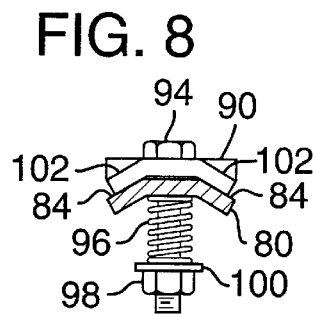
FIG. 8 is a view of the transfer arm assembly showing the normal position of the arm assembly components; and, FIG. 9 is another view of the transfer arm assembly illustrating another pivotal movement.
Figure 9:
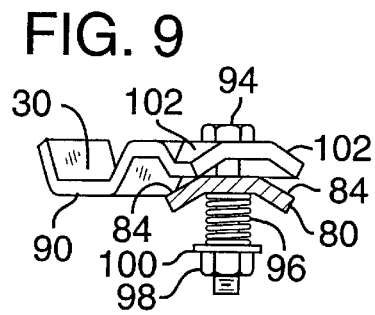

An arm segment 90 (front section) is removably mounted to the base section 80 (rear section). The arm segment 90 has an aperture 92 (bore) that is alignable with the aperture 82 in the base section 80. The arm segment 90 is attached to the base section 80 by a bolt (pin) 94 that extends through the aligned apertures 82, 92. A biasing member such as a spring 96 is mounted on the bolt 94 and is secured by a nut 98 and washer 100. The spring 96 is positioned between the underside 85 of the base section 80 and the washer 100, the washer 100 defining an engaging shoulder for the spring (FIG. 7). The arm segment 90 has a portion that is similarly channel shaped having tapered sides 102 that engage the sides 84 of the base section 80 when the arm segment 90 is mounted to the base section 80 (best seen in FIG. 7). The distal end of the arm segment 90 is formed into a cradle or finger 30.

The mounting arrangement of the arm segment 90 to the base section 80 permits the arm segment 90 to pivot about the axis of the bolt 94 when an excessive force is applied to either side of the arm segment 90. The arm segment 90 is movable side to side relative to the base section 80 as indicated by arrow 106 in FIG. 6. The arm segment 90 is shown in one side pivoted position relative to the base section 80 in FIG. 9. When the arm segment 90 is pivoted to a degree where the sides 84, 102 remain in engagement, the arm segment will simply pivot back to its normal position (FIG. 8) due to the biasing force of the spring 96 and the interaction of the sides 84, 102. If the pivoting movement exceeds that shown in FIG. 9 i.e., with sides 102 riding up onto the top surface of base section 80, the arm segment 90 is manually pivoted back into alignment.

The arm segment 90 is also pivotal upwardly and downwardly with respect to the base section 80 as indicated by arrow 108. The arm segment 90 (FIG. 7) is shown pivoted upward as indicated by the dashed outline 90*a* and is shown pivoted downward as indicated by the dashed outline 90*b*. When the excessive force is removed from the arm segment 90, the arm segment 90 will return to its normal position (shown in solid line) due to the biasing force of the spring 96.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A lumber stacker for stacking lumber in a stack comprising:

a stacker fork assembly, a lumber conveyor conveying lumber to the stacker fork assembly, said fork assembly oscillating between a receiving position proximal to the lumber conveyor and a depositing position over a stack for conveying tiers of lumber from the conveyor to the stack;

a sticker conveyor conveying stickers to a position proximal to the receiving position of the fork assembly, and a sticker transfer apparatus transferring stickers from the sticker conveyor to the receiving position for transfer of the stickers to the fork assembly;

said stacker fork assembly, said sticker conveyor and said sticker transfer apparatus cooperatively cycled to transfer the stickers to the fork assembly as the fork assembly is maneuvered to receive tiers of lumber;

said sticker transfer apparatus comprising transfer arms having holding fingers provided on a front section of the transfer arms that is projected into the path of the sticker conveyor to receive stickers from the sticker conveyor, and said front section projected into the path of the fork assembly to transfer the stickers to the fork assembly;

said transfer arms further including a rear section pivotally connected to the front section and including a biasing feature urging the front and rear sections of each transfer arm to a stationary relationship for normal operation in transferring the sticks from the conveyor to the stacker fork assembly, said biasing member responsive to an abnormal crash as between the front section and one of the conveyor and stacker fork assembly to resistively permit pivotal movement of the front section relative to the rear section for pivoting of the front section out of the defined path of said one of the conveyor and stacker fork assembly.

2. A lumber stacker as defined in claim 1 wherein:

said front and rear sections are pivotally pinned together, said biasing member urging the sections into the stationary relationship and upon impact sufficient to overcome the urging of the biasing member, said biasing member releasably permitting relative pivoting of the front and rear sections.

3. A lumber stacker for stacking lumber in a stack comprising:

a stacker fork assembly, a lumber conveyor and a stack, said fork assembly oscillating between a receiving position proximal to the lumber conveyor and a depositing position over the stack for conveying tiers of lumber from the conveyor to the stack;

a sticker conveyor conveying stickers to a position proximal to the receiving position of the fork assembly and a sticker transfer apparatus transferring stickers from the sticker conveyor to the receiving position for transfer of the stickers to the fork assembly;

said stacker fork assembly, said sticker conveyor and said sticker transfer apparatus cooperatively cycled to transfer the stickers to the fork assembly as the fork assembly is maneuvered to receive tiers of lumber;

said sticker transfer apparatus comprising transfer arms having holding fingers that receive stickers from the sticker conveyor and transfer the stickers into the path of the fork assembly to be received by the fork assembly;

said transfer arms each having a rear section and another section with adjacent ends of the sections of each transfer arm being overlapped and the overlapped ends being channel-shaped and nested together to establish a desired operative relationship, a bolt extended through the overlapped ends of each transfer arm section which pivotally pins the sections od each transfer arm together, the bolt extended beyond one of the sections and having a shoulder spaced from said one of the sections and a biasing spring between said one of the sections and the shoulder to urge nesting of the overlapped ends and permitting separation upon impact and relative movement as permitted by the bolt connection.

4. A lumber stacker as defined in claim 1 wherein said sections are connected together to permit relative pivotal movement of the sections in multiple planes in response to differently directed impacts when subjected to a crash.

* * * * *